United States Patent [19]

Dunn

[11] 4,307,743

[45] Dec. 29, 1981

[54] DEVICE TO START AN OVERCONTRACTED MIXED COMPRESSION SUPERSONIC INLET

[75] Inventor: Baxton M. Dunn, Kent, Wash.

[73] Assignee: The Boeing Company, Seattle, Wash.

[21] Appl. No.: 192,684

[22] Filed: Oct. 1, 1980

[51] Int. Cl.³ ............................................. B64D 33/02
[52] U.S. Cl. .................................. 137/15.1; 244/53 B
[58] Field of Search ........................... 137/15.1, 15.2; 244/53 B

[56] References Cited

U.S. PATENT DOCUMENTS

| | | | |
|---|---|---|---|
| 3,011,307 | 12/1961 | Edelfelt | 137/15.1 |
| 3,430,640 | 3/1969 | Lennard | 137/15.1 |
| 3,439,692 | 4/1969 | Pike | 137/15.2 |
| 3,667,704 | 6/1972 | Assmann | 244/53 B |
| 4,121,606 | 10/1978 | Holland | 244/53 B X |

*Primary Examiner*—Alan Cohan
*Attorney, Agent, or Firm*—Thomas H. Murray

[57] ABSTRACT

A hinged inlet cover for an overcontracted mixed compression supersonic inlet which does not eject from the aircraft, which reduces carriage drag of the aircraft and which, at the same time, produces an increase in inlet performance by utilizing a dynamic starting process as the cover opens. The cover is actuable to open the inlet by aerodynamic forces.

5 Claims, 6 Drawing Figures

DEVICE TO START AN OVERCONTRACTED MIXED COMPRESSION SUPERSONIC INLET

BACKGROUND OF THE INVENTION

By virtue of their low cowl angles, mixed compression inlets for supersonic aircraft (e.g., missiles) have lower drag than all-external compression inlets. However, they also have lower pressure recovery than external compression inlets due to the fact that the internal area contraction, or supersonic diffuser, within the inlet is limited by a supersonic flow "starting" phenomenon. "Starting" can be defined as a stable condition in which the flow is supersonic at the cowl inlet lip and the terminal normal shock wave is located downstream of the inlet throat (i.e., the minimum cross-sectional area of the inlet duct). Starting of mixed compression inlets with internal area contractions greater than the limit can be implemented by varying the internal geometry of the duct with remote actuators. This provides an increase in pressure recovery, but this approach is too costly for many missiles, particularly tactical missiles.

Aside from the starting problem, supersonic inlets for missiles generally have covers for reducing the overall weapon stores drag when carried on an aircraft and for reducing missile drag during the rocket-boost phase of the the the missile. These covers are normally ejected just prior to ramjet ignition, thus posing a hazard to the missile and/or launch aircraft.

SUMMARY OF THE INVENTION

In accordance with the present invention, an overcontracted mixed compression supersonic inlet is provided incorporating a hinged inlet cover actuable by aerodynamic forces for effecting starting. At the same time, the cover is not ejectable and does not pose a threat to the missile and/or launch aircraft.

Specifically, there is provided an overcontracted mixed compression supersonic inlet for ramjet powered missiles having an air inlet opening for admitting external air into a duct leading to a ramjet engine combustor, together with a highly restricted throat portion in the duct. The inlet has opposed lip portions, one of which extends beyond the other. A cover for the inlet opening is permanently hinged near the forward edge of the lip portion which extends beyond the other and is provided with support means for holding the cover in a position where it extends between the forward edges of the two lip portions and closes the air inlet. Means are provided for releasing the support means after the missile reaches a supersonic speed whereby the cover will be forced to rotate about its hinged connection and open the inlet by the force of air impinging on the outer surface of the cover. As the cover opens, a point is reached at some intermediate cover position where the internal aerodynamic flow structure will permit the "overcontracted" inlet to "start", whereas without the pivoting cover concept, the inlet would not start because the throat constriction is too large.

The above and other objects and features of the invention will become apparent from the following detailed description taken in connection with the accompanying drawings which form a part of this specification, and in which.

Figure 1:
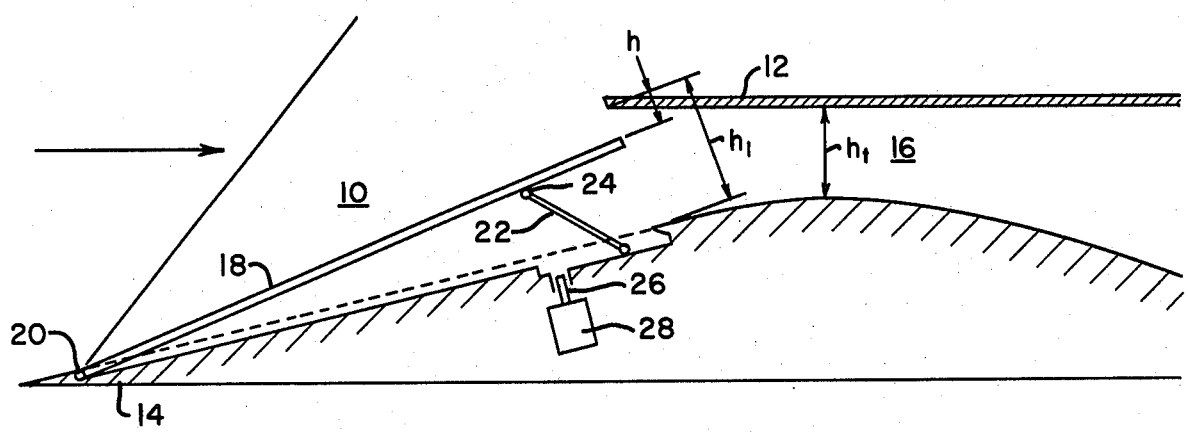
FIG. 1 is a schematic illustration of one embodiment of the invention.

With reference now to the drawings, and particularly to FIG. 1, the inlet shown includes an inlet opening 10 formed between opposed lip portions 12 and 14, the forward edge of the lip portion 14 extending beyond the forward edge of lip portion 12. Formed in the inlet opening 10 is a highly reduced (i.e., overcontracted) cross-sectional area throat, generally indicated by the reference numeral 16.

In accordance with the present invention, the opening 10 is normally covered by a cover 18 which is hinged near the forward edge of the lip 14 at 20. Normally, the cover 18 will be rotated into a position where it extends between the forward edges of the lip portions 14 and 12 by means of a support rod 22 which is hinged to the cover at 24 and normally held in an upright position by means of a latch 26. The inlet of the invention is particularly adapted for use with integral rocket-ramjet engines for aircraft. In such engines, a rocket propellant is initially ignited and burned without any air passing into the combustion chamber. In this phase of operation, the engine acts as a rocket. After the rocket propellant is burned, air is permitted to flow through the inlet shown in FIG. 1 and into the interior of a ramjet engine combustor where fuel burns in the presence of air to effect ramjet propulsion. During the rocket phase of operation, the cover 18 is held in its closed position by the support 22. However, after the rocket propellant is burned, the latch 26 is actuated by means of actuator 28 to permit the lower end of the support 22 to move to the right as viewed in FIG. 1, thereby opening inlet opening 10.

Figure 2A:
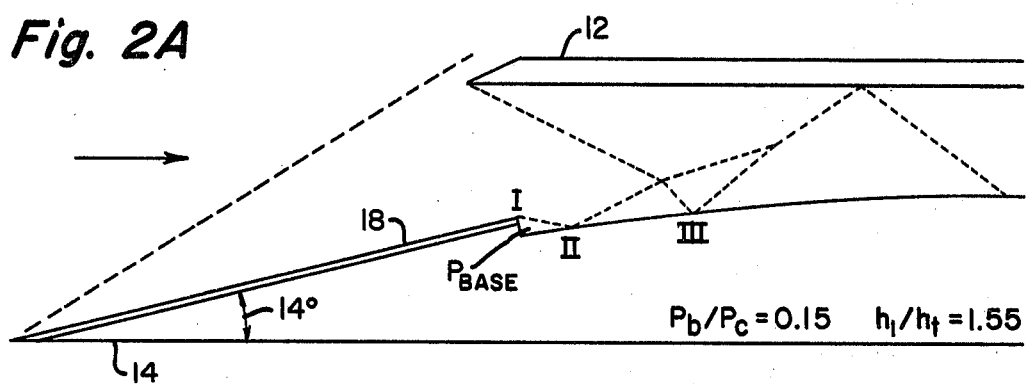
FIGS. 2A through 2D are illustrations of the shock patterns occurring in the inlet of FIG. 1 under different conditions.
Figure 2B:
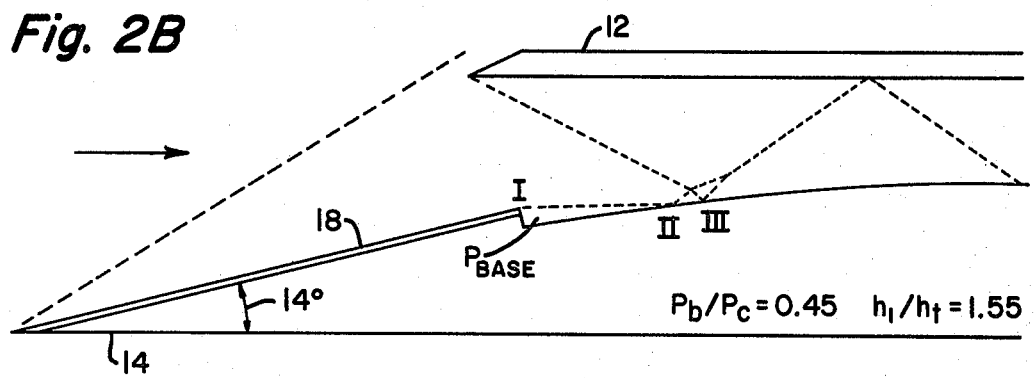

Thus, initially the cover 18 is mechanically constrained such that the dimension $h=0$. By virtue of the missile speed, there is a pressure differential across the cover. When the latch 26 is triggered and the support 22 is effectively removed, the aerodynamic forces on the cover 18 will cause it to rotate clockwise about the hinged connection 20 from a position where it covers the opening 10 to a position, shown in broken lines, where it completely opens the opening. At the inital position, the dimension h equals zero; while at the fully-open position, the dimension $h=h_1$. $h_t$ is the height of the throat section 16. The fixed contraction area ratio, $h_1/h_t$, is too large (i.e., overcontracted) to permit the inlet to "start"; however, the starting process is controlled by the ratio of $h/h_t$. At some intermediate cover position between the fully-closed and fully-open positions, the internal aerodynamic flow structure will permit the inlet to "start". The starting process is dependent on two parameters, first the cover angle, and secondly, the base pressure $P_{base}$, of the separated flow region after the cover. FIGS. 2A through 2D show the flow field for ramp angle of 14° but with ratios $P_b/P_c$ of base-to-cover pressures of 0.15, 0.45, 0.55 and 0.85, respectively. It can be seen that the flow is of two dintinct types. For a low ratio, $P_b/P_c$ the expansion of the air flow is such that the constant pressure boundary line I–II will strike the solid surface of the inlet and reflect as a shock. This type of flow, called Type 2 flow, is shown in FIGS. 2A and 2B.

Figure 2C:
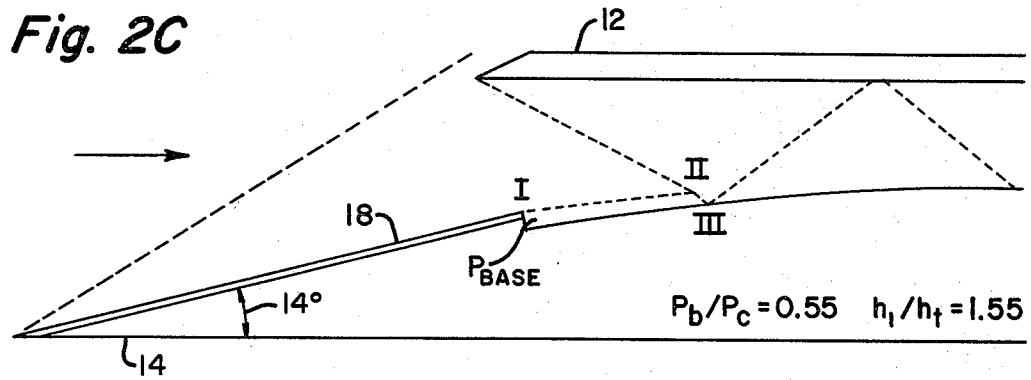
Figure 2D:
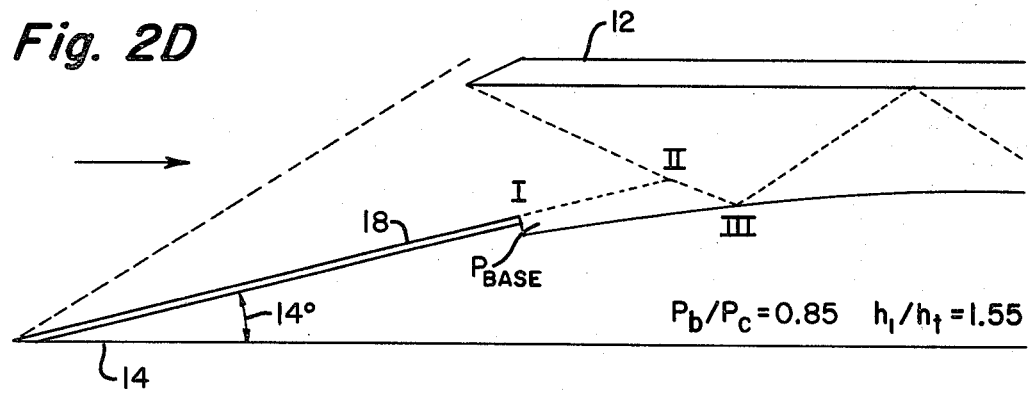

The second type of flow, referred to as Type 1 flow, is shown in FIGS. 2C and 2D. Here the free constant pressure coundary (line I-II) intersects the cowl shock and is subsequently turned to maintain constant pressure (line II-III). The turned flow intersects the solid inlet surface at Point III and is reflected as a very strong shock.

Figure 3:
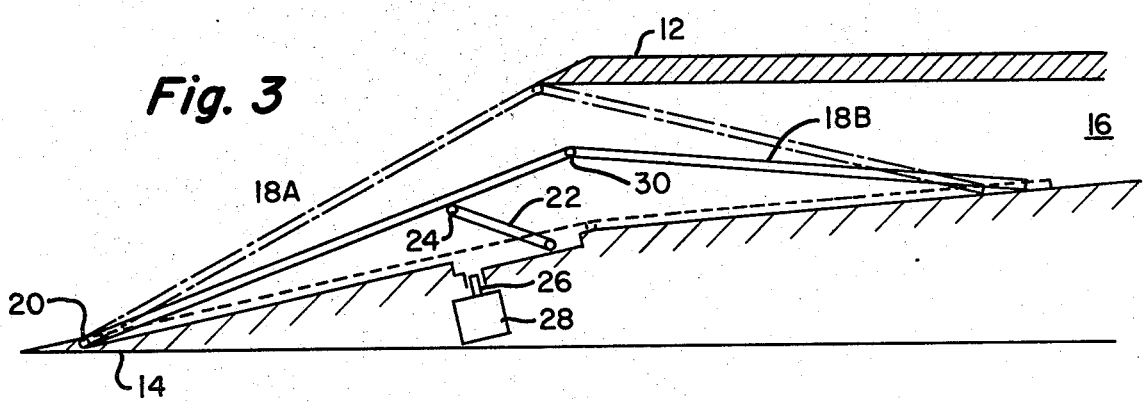
FIG. 3 is an illustration of an alternative embodiment of the invention in which the cover is formed of two folding panels.

Because of the complexity of the flow, the inlet may not start except for low cover angles, in which case the increase in performance is less significant. If this is the case, the alternative configuration which eliminates the interaction of the cowl shock and the constant pressure boundary (line I-II) shown in FIG. 3 is possible. This configuration is the same as that of FIG. 1 but has a two-surface folding cover 18A, 18B hinged together at 30. While the second configuration shown in FIG. 3 has simpler and more positive aerodynamic flow "starting" characteristics, it is more complex mechanically.

Although the invention has been shown in connection with certain specific embodiments, it wil be readily apparent to those skilled in the art that various changes in form and arrangement of parts may be made to suit requirements without departing from the spirit and scope of the invention.

I claim as my invention:

1. An overcontracted mixed compression supersonic inlet for ramjet powered missiles comprising an air inlet opening for admitting external air into a duct leading to a ramjet engine combustor, said inlet having opposed lip portions one of which extends beyond the other, a cover for said inlet opening hinged to the forward edge of said lip portion which extends beyond the other, support means for holding said cover in a position where it extends between the forward edges of said lip portions and closes the air inlet, and means for releasing said support means after said missile reaches a supersonic speed whereby said cover will be forced to rotate about its hinged connection and open said inlet opening by the force of air impinging on the outer surface of said cover.

2. The inlet of claim 1 wherein said opening is provided with an overcontracted throat portion aft of said lip portions.

3. The inlet of claim 1 wherein said support means comprises a pivoted support member.

4. The inlet of claim 1 in which, in a position of said cover intermediate between its fully-closed and fully-open positions, said inlet will "start".

5. The cover of claim 1 wherein said cover is non-ejectable.

* * * * *